United States Patent [19]

Mizutani et al.

[11] Patent Number: 4,628,039
[45] Date of Patent: Dec. 9, 1986

[54] SINTERED SILICON NITRIDE BODY

[75] Inventors: Michitaka Mizutani, Tsu; Kiyoshi Yokoyama, Kokubu, both of Japan

[73] Assignee: Kyocera Corporation, Kyoto, Japan

[21] Appl. No.: 708,349

[22] Filed: Mar. 5, 1985

[30] Foreign Application Priority Data

Mar. 6, 1984 [JP] Japan ................................ 59-43575
Aug. 25, 1984 [JP] Japan ................................ 59-178089

[51] Int. Cl.$^4$ .............................................. C04B 35/58
[52] U.S. Cl. ........................................ 501/97; 264/60; 501/98; 501/152
[58] Field of Search ..................... 501/97, 98, 152; 264/60

[56] References Cited

U.S. PATENT DOCUMENTS

| | | | |
|---|---|---|---|
| 4,097,293 | 6/1978 | Komeya et al. | 501/98 |
| 4,131,459 | 12/1978 | Fletcher et al. | 264/60 |
| 4,143,107 | 3/1979 | Ishii et al. | 501/126 |
| 4,172,107 | 10/1979 | Nakamura et al. | 264/60 |
| 4,180,410 | 12/1979 | Masaki | 501/98 |
| 4,234,343 | 11/1980 | Andersson | 501/98 |
| 4,499,192 | 2/1985 | Shimamori et al. | 501/98 |
| 4,506,021 | 3/1985 | Jack et al. | 501/98 |
| 4,511,402 | 4/1985 | Miura et al. | 501/98 |

FOREIGN PATENT DOCUMENTS

| | | |
|---|---|---|
| 49-21091 | 5/1974 | Japan . |
| 52-3649 | 1/1977 | Japan . |
| 59-146980 | 8/1984 | Japan ................................ 501/97 |

OTHER PUBLICATIONS

CRC Handbook of Chemistry and Physics, 61st ed. 1980–1981, (pp. F216–217 showing radius in Å of elements).

Primary Examiner—Helen M. McCarthy
Attorney, Agent, or Firm—Spensley Horn Jubas & Lubitz

[57] ABSTRACT

Disclosed is a sintered ceramic body having a composition comprising (i) $Si_3N_4$, (ii) a combination of an oxide of an element of the group IIIa of the Periodic Table having an ionic radius smaller than 0.97 Å and an oxide of other element of the group IIIa of the Periodic Table, having an ionic radius larger than 0.97° and (iii) an oxide or nitride of at least one of the following: (1) at least one element of group IIa of the Periodic Table; (2) Al; (3) Ti; (4) Cr; (5) Ga; (6) Zr; and (7) Si. This sintered silicon nitride body shows a high oxidation resistance when it is used for a long time at high temperatures, and the sintered body is excellent in the creep characteristics and flexural strength at high temperatures.

7 Claims, No Drawings

SINTERED SILICON NITRIDE BODY

BACKGROUND OF THE INVENTION (1) Field of the Invention

The present invention relates to a sintered silicon nitride body having a novel composition, which is improved in mechanical properties such as creep resistance and flexural strength at high temperatures and is excellent in the oxidation resistance.

(2) Description of the Prior Art

A sintered silicon nitride ($Si_3N_4$) body is known as a high temperature material or a high abrasion resistance material. However, $Si_3N_4$ is defective in that the sintering property is bad, and as a material for production of a sintered body having high density and high strength, there has already proposed a silicon nitride composition in which an oxide of an element of the group IIIa of the Periodic Table, such as yttria ($Y_2O_3$), is incorporated or $Al_2O_3$ is further incorporated (see, for example, Japanese Patent Publication No. 21091/74 or No. 3649/77). However, a sintered body obtained from this composition is still insufficient in the flexural strength at room temperature (about 60 kg/mm$^2$), and it has been found that when this sintered body is used for a long time at a high temperature, especially in a high-temperature oxidative atmosphere, the sintered body readily undergoes oxidation and such characteristics as the creep resistance, flexural strength, dimension precision and shape precision are drastically reduced.

SUMMARY OF THE INVENTION

It is therefore a primary object of the present invention to provide a sintered silicon nitride body which is improved in mechanical characteristics such as the flexural strength and creep resistance at high temperatures.

Another object of the present invention is to provide a sintered body of silicon nitride having a novel composition, which is improved in the sintering property of $Si_3N_4$ and capable of providing a dense molded body and is capable of providing a sintered body in which the mechanical characteristics and oxidation resistance are highly improved while controlling the growth of crystal grains at high temperatures.

More specifically, in accordance with the present invention, there is provided a sintered silicon nitride body having a composition comprising (i) 80 to 99.8 mole% of silicon nitride, (ii) at least one oxide of an element of the group IIIa of the Periodic Table having an ionic radius smaller than 0.97 Å and (b) at least one oxide of an element of the group IIIa of the Periodic Table which is different from said element of the group IIIa of the Periodic Table, the total amount of the oxides (a) and (b) being 0.2 to 20 mole% and the (a)/(b) molar ratio being within a range of from 10/90 to 90/10, and (iii) an oxide or nitride of at least one of the following in an amount of 0.1 to 5 parts by weight per 100 parts by weight of the sum of the components (i) and (ii):

(1) At least one element of the group IIa of the periodic table;
(2) Al;
(3) Ti;
(4) Cr;
(5) Ga;
(6) Zr; and
(7) Si

DETAILED DESCRIPTION OF THE PREFERRED EMBODIMENTS

According to the present invention, a sintered silicon nitride body is prepared from a composition comprising $Si_3N_4$, oxides of rare earth elements and an oxide or nitride of aluminum or the like. The present invention is prominently characterized in that an oxide of an element of the group IIIa of the Periodic Table having an ionic radius smaller than 0.97 Å and an oxide of other element of the group IIIa of the Periodic Table, that is, an element having an ionic radius larger than 0.97 Å, are combined at a specific ratio and used as the rare earth element oxide. According to the present invention, by dint of this characteristic feature, the sintering property of $Si_3N_4$ is improved, with the result that a sintered body which is highly densified and has an improved flexural strength can be obtained. Namely, a sintered $Si_3N_4$ body which is excellent in such mechanical characteristics as the creep resistance and flexural strength at high temperatures and also in the oxidation resistance can be obtained according to the present invention.

It is known that in elements of the lanthanum series among rare earth elements, ionic radii are gradually decreased little by little with increase of the atomic number. Trivalent ionic radii of rare earth elements are shown in Table A below.

TABLE A

| Ionic Radii (Å) | |
|---|---|
| Larger Than 0.97 Å (b) | Smaller Than 0.97 Å (a) |
| La (1.06) | Ce($Ce^{4+}$) (0.94) |
| Pr (1.01) | Y (0.89) |
| Nd (0.99) | Yb (0.86) |
| Th ($Th^{4+}$) (1.10) | Sm (0.96) |
| | Eu (0.95) |
| | Tb (0.92) |
| | Dy (0.90) |
| | Lu (0.84) |
| | Tm (0.86) |
| | Ho (0.89) |
| | Gd (0.93) |
| | Sc (0.81) |

The reason why the above-mentioned excellent functional effects can be attained in the present invention by combining oxides of elements of the group IIIa of the Periodic Table differing in the ionic radius at a specific ratio has not been completely elucidated, but the following can be considered.

Silicon nitride powder is covered with a coating of silica ($SiO_2$). When two kinds of rare earth element (RE) oxides differing in the ionic radius are added to silicon nitride powder, reactions of $SiO_2$-$(RE)_2O_3$ and $Si_3N_4$-$(RE)_2O_3$ take place, and it is considered that phases are formed according to the following rule. The rare earth element oxide having a smaller ionic radius is likely to react with $SiO_2$ and such compounds as $(RE)_2O_3.(SiO_2)_2$ and $(RE)_2O_3.(SiO_2)$ are formed in the sintered body. On the other hand, the rare earth element oxide having a larger ionic radius is likely to react with $Si_3N_4$ and such a compound as $(RE)_2O_3.Si_3N_4$ is formed in the sintered body. In compounds of the type $(RE)_2O_3.(SiO_2)_2$, a smaller ionic radius of RE gives a higher melting point and in compounds of the type $(RE)_2O_3.Si_3N_4$, a larger ionic radius of RE gives a higher melting point. However, if two kinds of rare earth element (RE) oxides differing in the ionic radius are added to $Si_3N_4$, the grain boundary phase is filled with a high-melting-point crystal phase to give an effective influence to improvement of the strength at high temperatures. Furthermore, an oxide of RE having a smaller ionic radius is highly effective as the sintering aid, and an oxide of RE having a larger ionic radius is effective for improving the strength at high temperatures. It is deemed that by combining these two RE oxides, the sintering property is prominently improved. It is believed that the excellent functional effects of the present invention can be attained for the above-mentioned reasons.

In the present invention, $Si_3N_4$ having an α-type or β-type crystal structure is used as silicon nitride.

The elements shown in Table A are used as the element of the group IIIa of the Periodic Table having an ionic radius smaller than 0.97 Å, and as preferred examples of the oxide, there can be mentioned yttria ($Y_2O_3$) and ytterbium oxide ($Yb_2O_3$). The elements shown in Table A are used as the element of the group IIIa of the Periodic Table having an ionic radius larger than 0.97 Å, and as preferred examples of the oxide, there can be mentioned lanthania ($La_2O_3$) and neodymium oxide ($Nd_2O_3$).

In the present invention, it is important that $Si_3N_4$ should be incorporated in an amount of 80 to 99.8 mole%, especially 90 to 99 mole%, based on the total amount of $Si_3N_4$ and the oxides of the elements of the group IIIa of the Periodic Table, and that at least two oxides of elements of the group IIIa of the Periodic Table should be incorporated in an amount of 0.2 to 20 mole%, especially 1 to 10 mole%, based on the total amount of $Si_3N_4$ and the oxides of the element of the group IIIa of the Periodic Table. If the amount of $Si_3N_4$ is outside the above-mentioned range, the strength at high temperatures is drastically degraded and the oxidation resistance is somewhat reduced.

If the total amount of at least two oxides of elements of the group IIIa of the Periodic Table is smaller than 0.2 mole%, densification is not caused and the strength is degraded, and the bulk specific gravity is reduced and the porosity is increased. On the other hand, if the total amount of the oxides of the elements of the group IIIa of the Periodic Table exceeds 20 mole%, the flexural strength at high temperatures is drastically reduced and the oxidation resistance is reduced.

It also is important that (a) an oxide of an element of the group IIIa of the Periodic Table having an ionic radius smaller than 0.97 Å and (b) an oxide of other element of the group IIIa of the Periodic Table should be combined and used at an (a)/(b) molar ratio of from 10/90 to 90/10, especially from 30/70 to 70/30. If the molar ratio is outside the above-mentioned range, mechanical properties such as the flexural strength, especially the creep resistance and flexural strength at high temperatures, are degraded.

According to the present invention, by adding 0.1 to 5 parts by weight of at least one member selected from oxides and nitrides of elements of the group IIa of the Periodic Table, Al, Ti, Cr, Ga, Zr and Si to 100 parts by weight of the main component comprising $Si_3N_4$ and appropriate amounts of oxides of elements of the group IIIa of the Periodic Table, a completely dense, antioxidative protecting covering layer is formed. If at least one member selected from oxides and nitrides of elements of the group IIa of the Periodic Table, Al, Ti, Cr, Ga, Zr and Si is added as the additive, there can be attained an effect of densifying a powdery oxide formed by oxidation of the composition comprising silicon nitride and rare earth element oxides. Accordingly, if a dense oxide covering layer is once formed on the surface by oxidation, this covering layer acts as a protecting layer for inhibiting diffusion of oxygen in the interior and oxidation reaction, and the oxidation resistance is prominently improved and the life of the sintered body in a high-temperature oxidative atmosphere is prolonged.

If the amount of the oxide or nitride of an element of the group IIa of the Periodic Table, Al, Ti, Cr, Ga, Zr or Si is smaller than 0.1 part by weight per 100 parts by weight of the main component comprising $Si_3N_4$ and appropriate amounts of oxides of elements of the group IIIa of the Periodic Table, the above-mentioned protecting layer is not sufficiently formed and the oxidation degree is increased. If the amount of the additive exceeds 5 parts by weight, the creep resistance and flexural strength at high temperatures are degraded.

A sintered silicon nitride body especially preferred for attaining the objects of the present invention has a composition comprising (i) 90 to 99 mole% of $Si_3N_4$, (ii) a combination of (a) $Yb_2O_3$ and (b) $Nd_2O_3$, the total amount of (a) and (b) being 1 to 10 mole% and the (a)/(b) molar ratio being in the range of from 30/70 to 70/30 and (iii) AlN or CrN in an amount of 0.1 to 5 parts by weight per 100 parts by weight of the sum of (i) and (ii).

Powders of the foregoing components are sufficiently mixed and finely divided by so-called wet pulverization or the like, and the pulverization product is subjected to spray granulation or the like and dried. Molding of the resulting composition is accomplished by mixing the composition with a binder such as a wax and subjecting the mixture to a known molding operation such as compression molding, injection molding or cold isostatic pressing. The obtained molded body is preliminarily sintered according to need and is then sintered in an inert atmosphere at a high temperature. Ordinarily, preliminary sintering is carried out at a temperature of 1500° to 1800° C. for 0.5 to 5 hours under atmospheric pressure, elevated pressure or reduced pressure. It is preferred that the sintering treatment be effected by hot isostatic pressing. Hot isostatic pressing is accomplished by charging the preliminarily sintered molded body in an apparatus comprising a pressure cylinder, a bottom closure, an insulator mantle and support arranged in the interior and a heating element arranged on the inner side of the insulator mantle, and supplying an inert gas under pressure and heating the charged molded body. Pressurization of 1500 to 2000 atmospheres (gauge) and heating to 1500° to 2000° C. are effective for this hot isostatic pressing. Nitrogen gas is advantageously used as the inert gas, but other gas such as argon can be used.

The sintered body obtained by the hot isostatic pressing treatment is polished by sand blast or the like according to need, and a product is thus obtained.

The present invention will now be described in detail with reference to the following examples that by no means limit the scope of the invention.

EXAMPLE 1

A powdery composition formed by adding an oxide of an element of the group IIa, Al, Ti, Cr, Ga, Zr or Si in an amount shown in Table 1 to a mixture of $Si_3N_4$ and at least two oxides of elements of the group IIIa of the Periodic Table was mixed in a ball mill for 24 hours. The obtained slurry was dried and granulated and then press-molded, and the binder used for molding was removed in vacuo and the molded body was sintered under conditions shown in Table 1. Thus, samples of Nos. 1 to 31 were obtained. Incidentally, in case of samples Nos. 7 and 9, preliminary sintering was carried out by hot pressing, or in case of samples Nos. 8 and 29 through 31, preliminary sintering was carried out at 1800° C. at 2.0 MPa in a nitrogen atmosphere, and then, the HIP treatment was carried out under sintering conditions shown in Table 1. In case of other samples, ordinary atmospheric sintering was carried out. With respect to each of these samples Nos. 1 through 31, the four-point bending flexural strength test according to Japanese Industrial Standard R-1601 was carried out at room temperature and at 1300° C., and the degree of oxidation was examined based on the weight increase ($mg/mc^2$) after 1000 hours' standing at 1300° C. to evaluate the oxidation resistance at high temperatures. The obtained results are shown in Table 1.

TABLE 1

| Sample No. | Composition of Main Component | | | | Composition of Additive (part by weight per 100 parts by weight of main component) | |
|---|---|---|---|---|---|---|
| | silicon nitride (mole %) | compound of element of group IIIa (mole %) | | | | |
| 1 | 95 | $Y_2O_3$ | 3 | | $Al_2O_3$ | 0.1 |
| | | $La_2O_3$ | 2 | | | |
| 2 | 95 | $Tb_2O_3$ | 3 | | AlN | 1 |
| | | $La_2O_3$ | 2 | | $SiO_2$ | 2 |
| 3 | 90 | $Yb_2O_3$ | 5 | | $SiO_2$ | 2 |
| | | $Pr_6O_{11}$ | 5 | | $TiO_2$ | 3 |
| 4 | 90 | $CeO_2$ | 5 | | $Cr_2O_3$ | 1 |
| | | $La_2O_3$ | 5 | | $Al_2O_3$ | 3 |
| 5 | 90 | $Y_2O_3$ | 5 | | $Al_2O_3$ | 1 |
| | | $La_2O_3$ | 5 | | $Ga_2O_3$ | 4 |
| | | | | | BaO | 1 |
| 6 | 85 | $Sm_2O_3$ | 5 | | $SiO_2$ | 1 |
| | | $Y_2O_3$ | 5 | | $ZrO_2$ | 2 |
| | | $CeO_2$ | 5 | | | |
| 7 | 95 | $Y_2O_3$ | 2 | | $Al_2O_3$ | 0.1 |
| | | $La_2O_3$ | 3 | | | |
| 8 | 95 | $Y_2O_3$ | 2 | | $Cr_2O_3$ | 0.3 |
| | | $Nd_2O_3$ | 3 | | SrO | 1 |
| 9 | 85 | $Y_2O_3$ | 5 | | $Al_2O_3$ | 3 |
| | | YN | 1 | | | |
| | | $La_2O_3$ | 9 | | | |
| 10* | 95 | $Y_2O_3$ | 3 | | — | |
| | | $La_2O_3$ | 2 | | | |
| 11* | 85 | $Y_2O_3$ | 5 | | — | |
| | | $La_2O_3$ | 5 | | | |
| | | $Sm_2O_3$ | 5 | | | |
| 12* | 98 | $Y_2O_3$ | 2 | | — | |
| 13* | 75 | $Y_2O_3$ | 15 | | $Al_2O_3$ | 7 |
| | | $La_2O_3$ | 10 | | | |
| 14* | 90 | $Y_2O_3$ | 5 | | $Al_2O_3$ | 7 |
| | | $La_2O_3$ | 5 | | | |
| 15 | 96 | $Nd_2O_3$ | 2 | | AlN | 0.5 |
| | | $Yb_2O_3$ | 2 | | | |
| 16 | 96 | $La_2O_3$ | 2 | | AlN | 0.5 |
| | | $Yb_2O_3$ | 2 | | | |
| 17 | 96 | $Nd_2O_3$ | 2 | | AlN | 1.5 |
| | | $Yb_2O_3$ | 2 | | | |
| 18 | 96 | $Nd_2O_3$ | 2 | | AlN | 4.0 |
| | | $Yb_2O_3$ | 2 | | | |
| 19 | 96 | $Nd_2O_3$ | 2 | | CrN | 0.5 |
| | | $Yb_2O_3$ | 2 | | | |
| 20 | 96 | $La_2O_3$ | 2 | | CrN | 0.5 |
| | | $Yb_2O_3$ | 2 | | | |
| 21 | 96 | $Nd_2O_3$ | 2 | | CrN | 4.0 |
| | | $Yb_2O_3$ | 2 | | | |
| 22 | 96 | $Nd_2O_3$ | 1 | | AlN | 0.5 |
| | | $Y_2O_3$ | 1 | | | |
| | | $Yb_2O_3$ | 2 | | | |
| 23 | 95.5 | $La_2O_3$ | 1.5 | | AlN | 0.5 |
| | | $Nd_2O_3$ | 1.5 | | | |
| | | $Yb_2O_3$ | 1.5 | | | |
| 24 | 95.5 | $La_2O_3$ | 1.5 | | AlN | 0.5 |
| | | $Sm_2O_3$ | 1.5 | | | |
| | | $Yb_2O_3$ | 1.5 | | | |
| 25 | 96 | $La_2O_3$ | 1 | | AlN | 0.5 |
| | | $Nd_2O_3$ | 1 | | | |
| | | $Sm_2O_3$ | 1 | | | |
| | | $Yb_2O_3$ | 1 | | | |
| 26 | 96 | $Nd_2O_3$ | 2 | | AlN | 0.5 |
| | | $Y_2O_3$ | 1 | | | |
| | | $Yb_2O_3$ | 1 | | | |
| 27 | 96 | $Nd_2O_3$ | 1 | | AlN | 0.5 |
| | | $Y_2O_3$ | 1 | | | |
| | | $Yb_2O_3$ | 2 | | | |
| 28 | 95.5 | $La_2O_3$ | 1.5 | | AlN | 0.5 |
| | | $Nd_2O_3$ | 1.5 | | | |
| | | $Yb_2O_3$ | 1.5 | | | |
| 29 | 95.5 | $La_2O_3$ | 1.5 | | AlN | 0.5 |
| | | $Sm_2O_3$ | 1.5 | | | |

TABLE 1-continued

| | | | | | | |
|---|---|---|---|---|---|---|
| 30 | 96 | Nd$_2$O$_3$ | 1.5 | | AlN | 0.5 |
| | | La$_2$O$_3$ | 1 | | | |
| | | Nd$_2$O$_3$ | 1 | | | |
| | | Sm$_2$O$_3$ | 1 | | | |
| | | Yb$_2$O$_3$ | 1 | | | |
| 31 | 96 | La$_2$O$_3$ | 2 | | AlN | 0.5 |
| | | Yb$_2$O$_3$ | 2 | | | |

| | | | | Properties of Sintered Body | | |
|---|---|---|---|---|---|---|
| | Sintering Conditions | | | flexural strength | flexural strength | |
| Sample No. | temperature (°C.) | nitrogen pressure (MPa) | bulk specific gravity | at room temperature $\sigma b_4$ (RT) | at high temperature $\sigma b_4$ (1300° C.) | weight increase of sintered body, 1300° C./1000 hrs (mg/cm$^2$) |
| 1 | 1950 | 10.0 | 3.26 | 115 | 101 | 0.50 |
| 2 | 1950 | 10.0 | 3.27 | 107 | 95 | 0.30 |
| 3 | 1850 | 0.1 | 3.45 | 96 | 82 | 0.70 |
| 4 | 1850 | 2.0 | 3.47 | 87 | 63 | 0.90 |
| 5 | 1850 | 0.98 | 3.49 | 76 | 54 | 0.40 |
| 6 | 1850 | 0.98 | 3.48 | 79 | 53 | 0.20 |
| 7 | 1800 | 0.1 (H.P) | 3.29 | 123 | 108 | 0.50 |
| 8 | 2000 | 200.0 | 3.26 | 94 | 86 | 0.60 |
| 9 | 1500 | 0.1 (H.P) | 3.58 | 76 | 63 | 0.90 |
| 10* | 1950 | 10.0 | 3.24 | 118 | 105 | 15.50 |
| 11* | 1850 | 0.98 | 3.44 | 83 | 62 | oxidation to the interior |
| 12* | 2000 | 20 | 2.78 | 43 | 40 | porosity of 13% |
| 13* | 1750 | 0.98 | 3.56 | 74 | 31 | 1.30 |
| 14* | 1750 | 2.0 | 3.49 | 76 | 25 | 1.20 |
| 15 | 1980 | 0.98 | 3.38 | 96 | 86 | 0.19 |
| 16 | 1980 | 0.98 | 3.37 | 105 | 101 | 0.17 |
| 17 | 1980 | 0.98 | 3.38 | 112 | 104 | 0.11 |
| 18 | 1980 | 0.98 | 3.37 | 105 | 91 | 0.10 |
| 19 | 1980 | 0.98 | 3.39 | 87 | 81 | 0.20 |
| 20 | 1980 | 0.98 | 3.39 | 89 | 86 | 0.21 |
| 21 | 1980 | 0.98 | 3.44 | 90 | 88 | 0.19 |
| 22 | 1980 | 0.98 | 3.37 | 95 | 91 | 0.21 |
| 23 | 1980 | 0.98 | 3.37 | 105 | 92 | 0.17 |
| 24 | 1980 | 0.98 | 3.37 | 103 | 90 | 0.16 |
| 25 | 1980 | 0.98 | 3.36 | 91 | 89 | 0.20 |
| 26 | 1980 | 0.98 | 3.36 | 89 | 83 | 0.21 |
| 27 | 1980 | 0.98 | 3.34 | 87 | 88 | 0.23 |
| 28 | 1750 | 200.0 (HIP) | 3.38 | 124 | 118 | 0.09 |
| 29 | 1750 | 200.0 (HIP) | 3.38 | 119 | 110 | 0.11 |
| 30 | 1750 | 200.0 (HIP) | 3.37 | 121 | 117 | 0.12 |
| 31 | 1750 | 200.0 (HIP) | 3.38 | 126 | 119 | 0.10 |

Note
*outside the scope of the present invention

Samples Nos. 1 through 9 and 15 through 31 are within the scope of the present invention, and in sintered bodies obtained by sintering a composition comprising 80 to 96 mole% of Si$_3$N$_4$ and 4 to 20 mole% of at least two oxides of elements of the group IIIa as the main component and at least one member selected from oxides and nitrides of elements of the group IIa, Al, Ti, Cr, Ga, Zr and Si in an amount of 0.1 to 5 parts by weight per 100 parts by weight of the main component under conditions indicated in Table 1, the flexural strength at 1300° C. is at least 53 kg/mm$^2$ and a higher strength is ensured, and the weight increase at the oxidation test is smaller than 1.0 mg/cm$^2$ and the oxidation resistance is excellent. It is ordinarily understood that if this weight increase is smaller than 1.0 mg/cm$^2$, an anti-oxidative protecting covering layer is sufficiently formed.

In contrast, it is seen that in samples Nos. 10 through 14, which are outside the scope of the present invention, the flexural strength at room temperature or high temperatures and the oxidation resistance are degraded. In case of samples Nos. 10 and 11 where the oxide or nitride of an element of the group IIa, Al, Ti, Cr, Ga, Zr or Si is not added, the weight increase of the sintered body is as large as 15.5 mg/cm$^2$ and the oxidation degree is very high or oxidation is advanced even to the interior, and it is seen that the oxidation resistance is poor. In sample No. 12, only Y$_2$O$_3$ is added as the oxide of the element of the group IIIa and the amount added of Y$_2$O$_3$ is 2 mole%, that is, outside the scope of the present invention, and the oxide or nitride of an element of the group IIa, Al, Ti, Cr, Ga, Zr or Si is not added. In this case, sintering is not satisfactory and the density is low, and therefore, the flexural strength at room temperature or at high temperatures is degraded and the porosity is 13% or higher. Accordingly, the product cannot be put into practical use.

In sample No. 13, Al$_2$O$_3$ is added as the additive in an amount of 7 parts by weight to 100 parts by weight of the main component comprising 75 mole% of Si$_3$N$_4$ and 25 mole% of the oxide of the element of the group IIa, and the composition is completely outside the scope of the present invention. In this sample, the flexural strength at high temperatures is drastically degraded and at the oxidation test, the weight increase of the sintered body is relatively too large and 1.3 mg/cm². In sample No. 14, the main component comprising $Si_3N_4$ and the oxide of the element of the group IIIa is within the scope of the present invention, but the amount of the oxide or nitride of the element of the group IIa, Al, Ti, Cr, Ga, Zr or Si is 7 parts by weight per 100 parts of the main component and exceeds the range specified in the present invention. In this sample, the flexural strength at high temperatures is degraded and at the oxidation test, the weight increase of the sintered body is 1.2 mg/cm² and is relatively too large.

As is apparent from the foregoing description, a sintered body obtained by sintering a composition comprising 100 parts by weight of a main component formed by adding appropriate amounts of oxides of elements of the group IIIa of the Periodic Table to $Si_3N_4$ and 0.1 to 5 parts by weight of at least one member selected from oxides and nitrides of elements of the group IIa of the Periodic Table, Al, Ti, Cr, Ga, Zr and Si has a flexural strength at 1300° C. of at least 53 kg/mm², which is practically sufficient, and the weight increase at the oxidation test is smaller than 1.0 mg/cm² and the sintered body is excellent in the oxidation resistance.

EXAMPLE 2

In the same manner as described, molded bodies were prepared by using compositions shown in Table 2, and samples Nos. 1 through 11 for the flexural test were obtained. With respect to these samples, creep test specimens having a thickness of 0.902 mm, a width of 4.01 mm and a length of 55 mm were similarly obtained. Samples Nos. 1 through 8 were obtained according to the ordinary nitrogen atmosphere sintering method, and samples Nos. 9 through 11 were obtained by sintering according to the hot isostatic pressing method.

With respect to each of the creep test specimens, the creep test was carried out at 1300° C. for 100 hours under a bending stress of 108 MN/m² according to the four-point bending method in which the upper span was 19.1 mm and the lower span was 39.8 mm. The strain quantity ($\epsilon$) of each specimen was determined according to the following formula:

$$\epsilon(\text{strain quantity}) = [(4hd)/L^2] \quad (1)$$

wherein h stands for the thickness of the specimen, L stands for the upper span and d stands for the quantity of deflection.

Furthermore, the flexural test specimens of samples Nos. 1 through 11 were subjected to the four-point bending strength test at room temperature and at 1300° C., and the degree of oxidation of the sintered body was examined based on the weight increase (mg/cm²) after 1000 hours' standing at 1300° C. to evaluate the oxidation resistance at high temperatures.

TABLE 2

| Sample No. | Composition of Main Component | | Composition of Additive | |
|---|---|---|---|---|
| | silicon nitride (mole %) | compound of element of group IIIa (mole %) | (part by weight per 100 parts by weight of main component) | |
| 1 | 95.9 | $Nd_2O_3$ 2.05 $Yb_2O_3$ 2.05 | AlN | 0.5 |
| 2 | 98.02 | $Nd_2O_3$ 0.99 $Yb_2O_3$ 0.99 | AlN | 0.5 |
| 3 | 99.61 | $La_2O_3$ 0.13 $Nd_2O_3$ 0.13 $Yb_2O_3$ 0.13 | AlN | 1.5 |
| 4 | 93.6 | $Nd_2O_3$ 2.5 $Sm_2O_3$ 1.5 $Yb_2O_3$ 2.4 | TiN CrN GaO | 0.5 0.1 0.3 |
| 5 | 88.1 | $La_2O_3$ 2.4 $Yb_2O_3$ 3.9 $Sc_2O_3$ 5.6 | BaO SrO $ZrO_2$ | 0.5 0.1 0.1 |
| 6* | 79 | $La_2O_3$ 7.0 $Yb_2O_3$ 7.0 $Sm_2O_3$ 7.0 | AlN CrN | 0.5 0.5 |
| 7* | 95.9 | $Nd_2O_3$ 2.05 $Yb_2O_3$ 2.05 | $Al_2O_3$ | 7.0 |
| 8 | 97.1 | $La_2O_3$ 0.99 $Nd_2O_3$ 0.95 $Yb_2O_3$ 0.96 | $SiO_2$ $Al_2O_3$ | 4.0 0.1 |
| 9 | 96 | $La_2O_3$ 1.0 $Nd_2O_3$ 1.0 $CeO_2$ 2.0 | AlN | 0.5 |
| 10 | 97.97 | $La_2O_3$ 0.67 $Yb_2O_3$ 0.44 $Gd_2O_3$ 0.92 | CrN | 0.3 |
| 11 | 98.86 | $Nd_2O_3$ 0.21 $Yb_2O_3$ 0.44 $Er_2O_3$ 0.49 | $SiO_2$ | 0.9 |

| | Sintering Conditions | | | Properties of Sintered Body | | | |
|---|---|---|---|---|---|---|---|
| | | | | flexural strength | flexural strength | weight increase | |
| Sample No. | temperature (°C.) | nitrogen pressure (MPa) | bulk specific gravity | at room temperature $\sigma b_4$ (RT) | at high temperature $\sigma b_4$ (1300° C.) | of sintered body 1300° C./1000 hrs (mg/cm²) | strain quantity ($\epsilon$), 1300° C./ 100 hrs ($\times$ 10$^{-4}$ m/m) |
| 1 | 1980 | 0.98 | 3.37 | 96 | 86 | 0.19 | 5.5 |
| 2 | 1980 | 0.98 | 3.26 | 99 | 91 | 0.10 | 4.1 |
| 3 | 2050 | 9.80 | 3.20 | 105 | 93 | 0.03 | 3.5 |
| 4 | 1900 | 0.98 | 3.41 | 81 | 77 | 0.52 | 7.2 |
| 5 | 1900 | 0.98 | 3.46 | 79 | 69 | 0.61 | 8.0 |
| 6* | 1900 | 0.98 | 3.69 | 59 | 38 | 2.41 | 15.2 |

TABLE 2-continued

| 7* | 1950 | 0.98 | 3.12 | 89 | 39 | 3.92 | 13.3 |
| 8 | 1950 | 0.98 | 3.29 | 91 | 64 | 0.72 | 5.6 |
| 9 | 1750 | 200.0 | 3.30 | 104 | 98 | 0.11 | 5.3 |
| 10 | 1750 | 200.0 | 3.26 | 109 | 100 | 0.09 | 4.9 |
| 11 | 1750 | 200.0 | 3.24 | 87 | 77 | 0.07 | 3.9 |

Note
*outside the scope of the present invention

Samples Nos. 1 through 5 and 8 through 11 are within the scope of the present invention. With respect to each of sintered bodies obtained by sintering a composition comprising 100 parts by weight of a main component comprising at least 80 mole% of silicon nitride ($Si_3N_4$) and oxides of elements of the group IIIa of the Periodic Table, at least two of which are selected from lanthanum oxide ($La_2O_3$), neodymium oxide ($Nd_2O_3$) and ytterbium oxide ($Yb_2O_3$), and 0.1 to 5 parts by weight of at least one member selected from oxides and nitrides of elements of the group IIa of the Periodic Table, Al, Ti, Cr, Ga, Zr and Si under conditions as indicated in Table 2, the flexural strength at 1300° C. is at least 64 kg/mm² and a higher strength is ensured, and the weight increase at the oxidation test is smaller than 0.72 mg/cm² and the oxidation resistance is excellent. It is understood that an anti-oxidative protecting covering layer is sufficiently formed. Furthermore, in each of samples Nos. 1 through 5 and 8 through 11, the strain quantity ($\epsilon$) at the creep test is smaller than $8.0 \times 10^{-4}$ m/m, and it is understood that these samples are excellent in the creep characteristics. In samples Nos. 6 and 7, which are outside the scope of the present invention, it is seen that the flexural strength at room temperature or at high temperatures, the oxidation resistance and the creep characteristics are degraded. More specifically, in sample No. 6, the content of silicon nitride ($Si_3N_4$) is 79 mole%, which is outside of the scope of the present invention, and the flexural strength at room temperatures is 59 kg/mm², the flexural strength at 1300° C. is 38 kg/mm², the weight increase of the sintered body at the oxidation test is 2.41 mg/cm² and the strain quantity ($\epsilon$) is $15.2 \times 10^{-4}$ m/m. It is seen that these properties are inferior to those of samples Nos. 1 through 5 and 8 through 11. In sample No. 7, 7 parts by weight of $Al_2O_3$ is added as the additive to 100 parts by weight of a composition comprising 97 mole% of silicon nitride and 3 mole% of oxides of elements of the group IIIa. In this case, the content of $Al_2O_3$ is outside the scope of the present invention. The flexural strength at 1300° C. is drastically degraded, and the weight increase of the sintered body at the oxidation test is as large as 3.92 mg/cm². Furthermore, it is seen that the strain quantity ($\epsilon$) at the creep test is as large as $13.3 \times 10^{-4}$ m/m.

EXAMPLE 3

This example is to prove that it is important for the oxidation resistance that the additive component should be added in a specific small amount.

Sintered bodies were prepared in the same manner as described in Example 1 except that components shown in Table 3 were used. The obtained results are shown in Table 3.

From the results shown in Table 3, it is understood that with increase of the amount added of SrO as the additive, the strength at room temperature and the strength at high temperatures are increased but the weight increase at the oxidation test is extreme and the oxidation resistance is degraded.

TABLE 3

| Sample No. | Main Component (mole %) | | | | Additive (parts by weight per 100 parts by weight of main component) | | Sintering Condition | | Bulk Specific Gravity | Strength | | Weight Increase (mg/cm²) |
|---|---|---|---|---|---|---|---|---|---|---|---|---|
| | $Si_3N_4$ | $(RE)_2O_3$ | | | | | temperature (°C.) | pressure (MPa) | | room temperature | 1300° C. | |
| 1 | 95 | $Y_2O_3$ | 3 | | SrO | 0.5 | 1950 | 10.0 | 3.27 | 105 | 95 | 0.20 |
| | | $La_2O_3$ | 2 | | | | | | | | | |
| 2 | 96 | $Nd_2O_3$ | 2 | | SrO | 1 | 1950 | 10.0 | 3.38 | 108 | 98 | 0.20 |
| | | $Yb_2O_3$ | 2 | | | | | | | | | |
| 3 | 96 | $La_2O_3$ | 2 | | SrO | 3 | 1950 | 10.0 | 3.40 | 110 | 99 | 0.10 |
| | | $Yb_2O_3$ | 2 | | | | | | | | | |
| 4 | 95 | $Y_2O_3$ | 3 | | SrO | 5 | 1950 | 10.0 | 3.27 | 112 | 100 | 0.30 |
| | | $La_2O_3$ | 1 | | | | | | | | | |
| 5 | 96 | $Nd_2O_3$ | 2 | | SrO | 8 | 1950 | 10.0 | 3.42 | 118 | 103 | 0.50 |
| | | $Yb_2O_3$ | 2 | | | | | | | | | |
| 6 | 96 | $Nd_2O_3$ | 2 | | SrO | 10 | 1950 | 10.0 | 3.44 | 120 | 110 | 0.90 |
| | | $Yb_2O_3$ | 2 | | | | | | | | | |

We claim:
1. A highly oxidation resistant sintered silicon nitride based body consisting essentially of:
   (i) 80 to 99.8 mole % of silicon nitride;
   (ii)
   (a) at least one oxide of an element of the group IIIa of the Periodic Table having an ionic radius smaller than 0.97 Å and
   (b) at least one oxide of an element of the group IIIa of the Periodic Table having an ionic radius larger than 0.97 Å,
   the total amount of the oxides (a) and (b) being 0.2 to 20 mole % of the sum of components (i) and (ii), and the (a)/(b) molar ratio being within a range of from 10/90 to 90/10, wherein the oxide of Ce and the oxide of Eu are considered to be within category (a) and the oxide of Pr is considered to be within category (b); and
   (iii) $SiO_2$ or an oxide or nitride of an element selected from the group consisting of Al, Ti, Cr, Ga, Zr and elements of the group IIa of the Periodic Table, in an amount of 0.1 to 5 parts by weight per 100 parts by weight of the sum of the components (i) and (ii).
2. A highly oxidation resistant sintered silicon nitride based body consisting essentially of:

(i) 90 to 99 mole % of $Si_3N_4$;

(ii) a combination of (a) $Yb_2O_3$ and (b) $Nd_2O_3$, the total amount of (a) and (b) being 1 to 10 mole % and the (a)/(b) molar ratio being in the range of from 30/70 to 70/30; and (iii) a chemical selected from the group consisting of AlN and CrN in an amount of 0.1 to 5 parts by weight per 100 parts by weight of the sum of (i) and (ii).

3. A highly oxidation resistant sintered silicon nitride based body consisting essentially of:

(i) 90 to 99 mole % of silicon nitride;

(ii)
- (a) at least one oxide of an element of the group IIIa of the Periodic Table having an ionic radius smaller than 0.97 Å and
- (b) at least one oxide of an element of the group IIIa of the Periodic Table having an ionic radius larger than 0.97 Å, the total amount of oxides (a) and (b) being 1 to 10 mole % of the sum of components (i) and (ii), and the (a)/(b) molar ratio being within a range of from 30/70 to 70/30, wherein the oxide of Ce and the oxide of Eu are considered to be within category (a) and the oxide of Pr is considered to be within category (b); and (iii) $SiO_2$ or an oxide or nitride of an element selected from the group consisting of Al, Ti, Cr, Ga, Zr and elements of the group IIa of the Periodic Table, in an amount of 0.1 to 5 parts by weight per 100 parts by weight of the sum of the components (i) and (ii).

4. A highly oxidation resistant sintered silicon nitride based body consisting essentially of:

(i) 80 to 96 mole % of silicon nitride;

(ii)
- (a) at least one oxide of an element of the group IIIa of the Periodic Table having an ionic radius smaller than 0.97 Å and
- (b) at least one oxide of an element of the group IIIa of the Periodic Table having an ionic radius larger than 0.97 Å, the total amount of oxides (a) and (b) being 4 to 20 mole % of the sum of components (i) and (ii), and the (a)/(b) molar ratio being within a range of from 10/90 to 90/10, wherein the oxide of Ce and the oxide of Eu are considered to be within category (a) and the oxide of Pr is considered to be within category (b); and (iii) $SiO_2$ or an oxide or nitride of an element selected from the group consisting of Al, Ti, Cr, Ga, Zr and elements of the group IIa of the Periodic Table, in an amount of 0.1 to 5 parts by weight per 100 parts by weight of the sum of the components (i) and (ii).

5. A highly oxidation resistant sintered silicon nitride based body consisting essentially of:

(i) 80 to 99.8 mole % of silicon nitride;

(ii)
- (a) at least one oxide of an element of the group IIIa of the Periodic Table having an ionic radius smaller than 0.97 Å and
- (b) at least one oxide of an element of the group IIIa of the Periodic Table having an ionic radius larger than 0.97 Å, the total amount of the oxides (a) and (b) being 0.2 to 20 mole % of the sum of components (i) and (ii), and the (a)/(b) molar ratio being within a range of from 10/90 to 90/10, wherein the oxide of Ce and the oxide of Eu are considered to be within category (a) and the oxide of Pr is considered to be within category (b); and (iii) an oxide or nitride of an element selected from the group consisting of Al, Ti, Cr, Ga, Zr and elements of the group IIa of the Periodic Table, in an amount of 0.1 to 5 parts by weight per 100 parts by weight of the sum of the components (i) and (ii).

6. A highly oxidation resistant sintered silicon nitride based body consisting essentially of:

(i) 90 to 99 mole % of silicon nitride;

(ii)
- (a) at least one oxide of an element of the group IIIa of the Periodic Table having an ionic radius smaller than 0.97 Å and
- (b) at least one oxide of an element of the group IIIa of the Periodic Table having an ionic radius larger than 0.97 Å, the total amount of oxides (a) and (b) being 1 to 10 mole % of the sum of components (i) and (ii), and the (a)/(b) molar ratio being within a range of from 30/70 to 70/30, wherein the oxide of Ce and the oxide of Eu are considered to be within category (a) and the oxide of Pr is considered to be within category (b); and (iii) an oxide or nitride of an element selected from the group consisting of Al, Ti, Cr, Ga, Zr and elements of the group IIa of the Periodic Table, in an amount of 0.1 to 5 parts by weight per 100 parts by weight of the sum of the components (i) and (ii).

7. A highly oxidation resistant sintered silicon nitride based body consisting essentially of:

(i) 80 to 96 mole % of silicon nitride;

(ii)
- (a) at least one oxide of an element of the group IIIa of the Periodic Table having an ionic radius smaller than 0.97 Å and
- (b) at least one oxide of an element of the group IIIa of the Periodic Table having an ionic radius larger than 0.97 Å, the total amount of oxides (a) and (b) being 4 to 20 mole % of the sum of components (i) and (ii), and the (a)/(b) molar ratio being within a range of from 10/90 to 90/10, wherein the oxide of Ce and the oxide of Eu are considered to be within category (a) and the oxide of Pr is considered to be within category (b); and (iii) an oxide or nitride of an element selected from the group consisting of Al, Ti, Cr, Ga, Zr and elements of the group IIa of the Periodic Table, in an amount of 0.1 to 5 parts by weight per 100 parts by weight of the sum of components (i) and (ii).

* * * * *